(12) United States Patent
Watanabe

(10) Patent No.: US 8,034,858 B2
(45) Date of Patent: Oct. 11, 2011

(54) POLYPROPYLENE RESIN COMPOSITION AND INJECTION MOLDED ARTICLE MADE FROM THE SAME

(75) Inventor: Tsuyoshi Watanabe, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/224,387

(22) Filed: Sep. 12, 2005

(65) Prior Publication Data

US 2006/0058434 A1 Mar. 16, 2006

(30) Foreign Application Priority Data

Sep. 15, 2004 (JP) ................................ 2004-268014

(51) Int. Cl.
*C08K 5/20* (2006.01)
(52) U.S. Cl. .................. 524/232; 524/210; 524/505
(58) Field of Classification Search .................. 524/232, 524/210, 230, 505
See application file for complete search history.

(56) References Cited

U.S. PATENT DOCUMENTS

| | | | |
|---|---|---|---|
| 6,031,034 A | 2/2000 | Morimoto et al. | |
| 2003/0114579 A1* | 6/2003 | Mori et al. | .................. 524/515 |
| 2004/0014854 A1 | 1/2004 | Watanabe et al. | |
| 2006/0052544 A1* | 3/2006 | Watanabe et al. | .............. 525/240 |
| 2007/0203273 A1* | 8/2007 | Van Riel et al. | .............. 524/232 |

FOREIGN PATENT DOCUMENTS

| | | |
|---|---|---|
| CN | 1134953 A | 11/1996 |
| EP | 0 739 944 A1 | 10/1996 |
| JP | 6-220270 A | 8/1994 |
| JP | 8-183412 A | 7/1996 |
| JP | 2001-261902 A | 9/2001 |
| JP | 2002-60560 A | 2/2002 |
| WO | WO 94/18267 A1 | 8/1994 |

OTHER PUBLICATIONS

English Translation of CN Office Action issued Sep. 18, 2009 from the Chinese Patent Office in counterpart CN Application No. 200510099993.3.

* cited by examiner

*Primary Examiner* — Peter D Mulcahy
(74) *Attorney, Agent, or Firm* — Panitch Schwarze Belisario & Nadel LLP

(57) ABSTRACT

Disclosed is a polypropylene resin composition comprising predetermined amounts of a propylene-ethylene block copolymer (A-1), a first ethylene-α-olefin random copolymer rubber (B-1) which has a density of from 0.85 to 0.885 g/cm$^3$ and a melt flow rate measured at 190° C. of 5 g/10 min or less, a second ethylene-α-olefin random copolymer rubber (B-2) which has a density of from 0.85 to 0.885 g/cm$^3$ and a melt flow rate measured at 190° C. of 10 g/10 min or more, an inorganic filler (C), a fatty acid amide (D), and optionally a propylene homopolymer (A-2). Injection molded articles produced from the composition is also disclosed.

18 Claims, 4 Drawing Sheets

POLYPROPYLENE RESIN COMPOSITION AND INJECTION MOLDED ARTICLE MADE FROM THE SAME

BACKGROUND OF THE INVENTION

1. Field of the Invention

The present invention relates to polypropylene resin compositions and to injection-molded articles made of the same. More particularly, the invention relates to polypropylene resin compositions superior in balance between impact resistance and rigidity and also superior in scratch resistance and also relates to injection-molded articles made from the same.

2. Description of the Related Art

Polypropylene resin has heretofore been used as an automotive material. In particular, materials not only having balanced impact resistance and rigidity but also having superior scratch resistance have recently been demanded in automotive interior component applications.

For example, Japanese Patent Application Publication No. 8-183412 discloses, as an automotive bumper being superior in paint adhesiveness, mold releasability and appearance, an automotive bumper which is an injection-molded article of a propylene-based resin composition having a melt flow rate of from 30 to 40 g/10 min and a flexural modulus of from 1200 to 18000 kg/cm$^2$, the composition comprising a block copolymer having a crystalline polypropylene portion and a propylene-ethylene random copolymer portion, an ethylene-propylene copolymer rubber, an ethylene-butene copolymer rubber, talc and higher fatty acid amide Even the polypropylene resin composition of the above-cited patent application has demanded for further improvement in scratch resistance as well as balance between impact resistance and rigidity.

Under such circumstances, the object of the present invention is to provide polypropylene resin compositions superior in balance between impact resistance and rigidity and also superior in scratch resistance and to provide injection-molded articles made of them.

SUMMARY OF THE INVENTION

The present invention provides, in one aspect, a polypropylene resin composition comprising:
 a propylene-ethylene block copolymer (A-1),
 a first random copolymer rubber (B-1) defined below,
 a second random copolymer rubber (B-2) defined below,
 an inorganic filler (C), and
 a fatty acid amide (D),
wherein in the combined weight of the propylene-ethylene block copolymer (A-1), the first and second random copolymer rubbers (B-1), (B-2) and the inorganic filler (C), the proportion of the propylene-ethylene block copolymer (A-1) is from 45 to 85% by weight, the proportion of the first random copolymer rubber (B-1) is from 5 to 25% by weight, the proportion of the second random copolymer rubber (B-2) is from 5 to 25% by weight, the combined proportion of the first and second random copolymer rubbers (B-1), (B-2) is from 10 to 30% by weight, and the proportion of the inorganic filler (C) is from 5 to 25% by weight, and wherein the amount of the fatty acid amide (D) for 100 parts by weight of a combined weight of the propylene-ethylene block copolymer (A-1), the first and second random copolymer rubbers (B-1), (B-2) and the inorganic filler (C) is from 0.05 to 1 part by weight;
 first random copolymer rubber (B-1): a random copolymer rubber composed of ethylene and α-olefin having 4-20 carbon atoms which has a density of from 0.85 to 0.885 g/cm$^3$ and a melt flow rate measured at 190° C. of 5 g/10 min or less,
 second random copolymer rubber (B-2): a random copolymer rubber composed of ethylene and α-olefin having 4-20 carbon atoms which has a density of from 0.85 to 0.885 g/cm$^3$ and a melt flow rate measured at 190° C. of 10 g/10 min or more.

The present invention provides, in another aspect, a polypropylene resin composition comprising:
 a propylene-ethylene block copolymer (A-1),
 a propylene homopolymer (A-2),
 a first random copolymer rubber (B-1) defined below,
 a second random copolymer rubber (B-2) defined below,
 an inorganic filler (C), and
 a fatty acid amide (D),
wherein in the combined weight of the propylene-ethylene block copolymer (A-1), the propylene homopolymer (A-2), the first and second random copolymer rubbers (B-1), (B-2) and the inorganic filler (C), the proportion of the propylene-ethylene block copolymer (A-1) is from 5 to 84% by weight, the proportion of the propylene homopolymer (A-2) is from 1 to 40% by weight, the proportion of the first random copolymer rubber (B-1) is from 5 to 25% by weight, the proportion of the second random copolymer rubber (B-2) is from 5 to 25% by weight, the combined proportion of the first and second random copolymer rubbers (B-1), (B-2) is from 10 to 30% by weight, and the proportion of the inorganic filler (C) is from 5 to 25% by weight,
and wherein the amount of the fatty acid amide (D) for 100 parts by weight of a combined weight of the propylene-ethylene block copolymer (A-1), the propylene homopolymer (A-2), the first and second random copolymer rubbers (B-1), (B-2) and the inorganic filler (C) is from 0.05 to 1 part by weight;
 first random copolymer rubber (B-1): a random copolymer rubber composed of ethylene and α-olefin having 4-20 carbon atoms which has a density of from 0.85 to 0.885 g/cm$^3$ and a melt flow rate measured at 190° C. of 5 g/10 min or less,
 second random copolymer rubber (B-2): a random copolymer rubber composed of ethylene and α-olefin having 4-20 carbon atoms which has a density of from 0.85 to 0.885 g/cm$^3$ and a melt flow rate measured at 190° C. of 10 g/10 min or more.

The present invention also provides, in even another aspect, injection-molded articles made from the polypropylene resin compositions.

According to the present invention, it is possible to obtain polypropylene resin compositions superior in balance between impact resistance and rigidity and also superior in scratch resistance and injection-molded articles made of the compositions.

DESCRIPTION OF THE PREFERRED EMBODIMENTS

Figure 1:
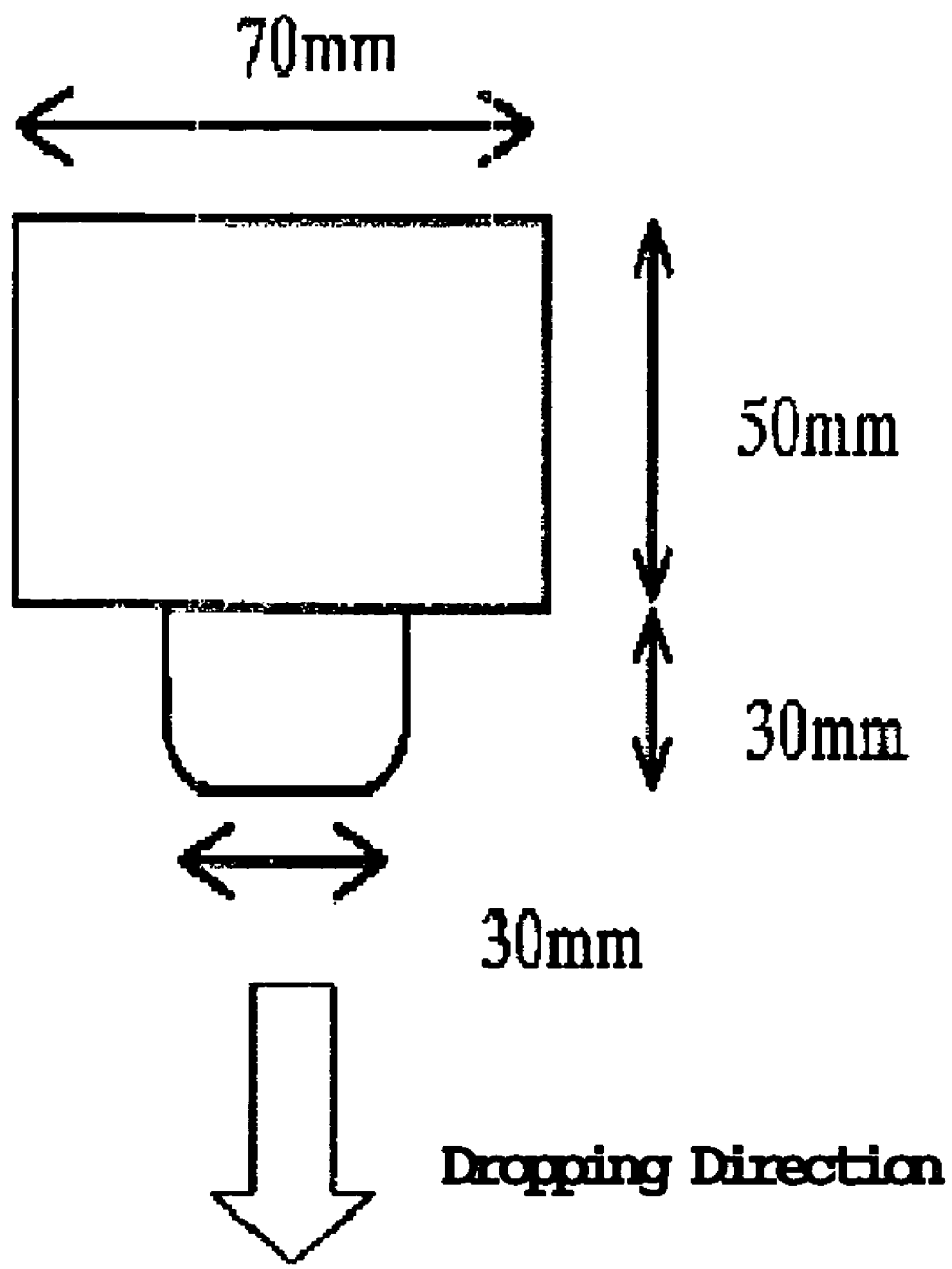
FIG. 1 is a rough sketch of a weight for use in an impact resistance test.

The propylene-ethylene block copolymer (A-1) used in the present invention is a copolymer composed of a propylene homopolymer portion (A-1a) and a propylene-ethylene random copolymer portion (A-1b).

In preferable embodiments, the weight proportions of the propylene homopolymer portion (A-1a) and the propylene-ethylene random copolymer portion (A-1b) in the propylene-ethylene block copolymer (A-1) are from 70 to 95% by weight and from 5 to 30% by weight, respectively, from the viewpoints of impact strength and rigidity.

More preferably, the homopolymer portion (A-1a) accounts for from 75 to 90% by weight and the random copolymer portion (A-1b) accounts for from 10 to 25% by weight.

The isotactic pentad fraction of the homopolymer portion (A-1a) in the block copolymer (A-1) is typically at least 0.97 and preferably not less than 0.98 from the viewpoints of rigidity and heat resistance.

The ethylene content $((C2')_{EP})$ of the random copolymer portion (A-1b) in the block copolymer (A-1) is typically from 25 to 55% by weight and preferably from 30 to 50% by weight from the viewpoints of impact resistance and tensile elongation at break.

The ethylene content (C2') of the block copolymer (A-1) is typically from 2 to 20% by weight, preferably from 4 to 15% by weight, and more preferably from 6 to 12% by weight from the viewpoint of impact resistance.

The intrinsic viscosity $([\eta]_{EP})$ of the random copolymer portion (A-1b) is typically from 1 to 7 dl/g and preferably from 2 to 6 dl/g from the viewpoints of balance between rigidity and impact resistance, inhibition of generation of hard spots and improvement in surface quality.

The melt flow rate (MFR) at 230° C. of the block copolymer (A-1) is typically from 0.3 to 150 g/10 min, preferably from 0.5 to 100 g/10 min and more preferably from 10 to 60 g/10 min from the viewpoints of fluidity and tensile elongation at break.

The block copolymer (A-1) may be prepared, for example, by a method in which the propylene homopolymer portion (A-1a) is prepared in a first step and then the propylene-ethylene random copolymer portion (A-1b) is prepared in a second step.

As a polymerization catalyst, for example, Ziegler catalysts and metallocene catalysts may be used. The polymerization method may be slurry polymerization, vapor phase polymerization, or the like.

The isotactic pentad fraction of the propylene homopolymer (A-2) is typically at least 0.97 and preferably not less than 0.98 from the viewpoints of rigidity and heat resistance.

The intrinsic viscosity $([\eta]_P)$ of the propylene homopolymer (A-2) is typically from 0.7 to 3 dl/g and preferably from 0.8 to 2 dl/g from the viewpoints of tensile elongation at break and fluidity.

The first random copolymer rubber (B-1) for use in the present invention is a random copolymer rubber composed of ethylene and α-olefin having 4-20 carbon atoms which has a density of from 0.85 to 0.885 g/cm³ and a melt flow rate measured at 190° C. of 5 g/10 min or less.

The second random copolymer rubber (B-2) for use in the present invention is a random copolymer rubber composed of ethylene and α-olefin having 4-20 carbon atoms which has a density of from 0.85 to 0.885 g/cm³ and a melt flow rate measured at 190° C. of 10 g/10 min or more.

The α-olefin having 4-20 carbon atoms as a constituent of the random copolymer rubber (B-1) and the α-olefin having 4-20 carbon atoms as a constituent of the random copolymer rubber (B-2) may independently be butene-1, pentene-1, hexene-1, heptene-1, octene-1, decene or the like. Preferred are butene-1, hexene-1 and octene-1. The random copolymer rubbers may include a single sort of α-olefin and also may include two or more sorts of α-olefin.

Specific examples of the random copolymer rubbers (B-1) and (B-2) include an ethylene-butene-1 random copolymer rubber, an ethylene-hexene-1 random copolymer and an ethylene-octene-1 random copolymer. The ethylene-octene-1 random copolymer, the ethylene-butene-1 random copolymer and the ethylene-hexene-1 random copolymer are preferable. More preferred are the ethylene-octene-1 random copolymer rubber and the ethylene-butene-1 random copolymer rubber. These random copolymer rubbers may be used solely or in combination.

The density of the first random copolymer rubber (B-1) is from 0.85 to 0.885 g/cm³ and preferably from 0.855 to 0.870 g/cm³. If the density is over 0.885 g/cm³, the impact resistance may deteriorate.

The melt flow rate (MFR) measured at 190° C. of the first random copolymer rubber (B-1) is 5 g/10 minor less and preferably from 0.3 to 3 g/10 min.

The density of the second random copolymer rubber (B-2) is from 0.85 to 0.885 g/cm³ and preferably from 0.855 to 0.880 g/cm³. If the density is over 0.885 g/cm³, the impact resistance may deteriorate.

The melt flow rate (MFR) measured at 190° C. of the second random copolymer rubber (B-2) is 10 g/10 min or more and preferably from 12 to 50 g/10 min. If the random copolymer rubber (B-2) has an MFR less than 10 g/10 min, the scratch resistance may deteriorate.

The random copolymer rubbers (B-1) and (B-2) may be prepared by a method using a known polymerization catalyst and a known polymerization technique. Examples of the known polymerization catalyst include Ziegler-Natta catalyst systems comprising a vanadium compound, an organoaluminum compound and a halogenated ester compound, and metallocene catalyst systems, namely, catalyst systems comprising a combination of alumoxiane or boron compound and a metallocene compound composed of a titanium, zirconium or hafnium atom coordinated with at least one cyclopentadienyl anion skeleton.

One example of the known polymerization technique is a method comprising copolymerizing ethylene and α-olefin in an inert organic solvent such as a hydrocarbon compound.

The inorganic filler (C) for use in the present invention is non-fibrous inorganic filler, fibrous inorganic filler, or a combination thereof. Examples of the non-fibrous inorganic filler include talc, mica, calcium carbonate, barium sulfate, magnesium carbonate, clay, alumina, silica, calcium sulfate, quartz sand, carbon black, titanium oxide, magnesium hydroxide, zeolite, molybdenum, diatomaceous earth, sericite, SHIRASU (light gray volcanic ash), calcium hydroxide, calcium sulfite, sodium sulfate, bentonite, graphite, etc.

Examples of the fibrous inorganic filler include fibrous magnesium oxysulfate, fibrous potassium titanate, fibrous magnesium hydroxide, fibrous aluminum borate, fibrous calcium silicate, fibrous calcium carbonate, carbon fiber, glass fiber and metal fiber.

Preferred are talc, mica, calcium carbonate, silica and fibrous magnesium oxysulfate and more preferred are talc and fibrous magnesium oxysulfate.

These inorganic fillers may be used solely or in combination.

The average particle diameter of non-fibrous inorganic fillers is typically 10 μm or less and preferably 5 μm or less. The average particle diameter of a non-fibrous inorganic filler means a 50% equivalent particle diameter D50, which is obtained from an integral distribution curve of the minus sieve method in which the filler is suspended in a liquid medium of water or alcohol using a centrifugal sedimentation type particle size distribution analyzer.

The fibrous inorganic fibers have an average fiber diameter of from 0.2 to 1.5 μm, an average fiber length of from 5 to 30 μm and an aspect ratio of from 10 to 50.

The inorganic filler (C) may be used in an untreated form or a treated foam. It may be surface-treated with a conventional coupling agent such as a silane coupling agent or a titanium coupling agent or a surfactant to improve the interfacial adhesion with polypropylene resins and the dispersibility in polypropylene resins. Examples of the surfactant include higher fatty acids, higher fatty acid esters, higher fatty acid amides and higher fatty acid salts.

The fatty acid amide (D) for used in the present invention is a fatty acid amide having 5 or more carbon atoms and preferably is a fatty acid amide represented by the following formula (1):

$$RCONH_2 \qquad (1)$$

wherein R represents an alkyl or alkenyl group having from 5 to 25 carbon atoms.

Examples of the fatty acid amide (D) include lauramide, stearamide, oleamide, behenamide and erucamide, which is preferred.

When the polypropylene resin composition of the present invention is a polypropylene resin composition comprising a propylene-ethylene block copolymer (A-1), a first and second random copolymer rubbers (B-1), (B-2), an inorganic filler (C) and a fatty acid amide (D), in the combined weight of the propylene-ethylene block copolymer (A-1), the first and second random copolymer rubbers (B-1), (B-2) and the inorganic filler (C), the proportion of the propylene-ethylene block copolymer (A-1) is from 45 to 85% by weight, the proportion of the first random copolymer rubber (B-1) is from 5 to 25% by weight, the proportion of the second random copolymer rubber (B-2) is from 5 to 25% by weight, the combined proportion of the first and second random copolymer rubbers (B-1), (B-2) is from 10 to 30% by weight, and the proportion of the inorganic filler (C) is from 5 to 25% by weight.

Preferably, the proportion of the propylene-ethylene block copolymer (A-1) is from 45 to 75% by weight, the proportion of the first random copolymer rubber (B-1) is from 10 to 25% by weight, the proportion of the second random copolymer rubber (B-2) is from 5 to 20% by weight, the combined proportion of the first and second random copolymer rubbers (B-1), (B-2) is from 15 to 30% by weight, and the proportion of the inorganic filler (C) is from 10 to 25% by weight.

The amount of the fatty acid amide (D) for 100 parts by weight of a combined weight of the propylene-ethylene block copolymer (A-1), the first and second random copolymer rubbers (B-1), (B-2) and the inorganic filler (C) is from 0.05 to 1 part by weight, and preferably from 0.1 to 0.5 part by weight.

When the polypropylene resin composition of the present invention is a polypropylene resin composition comprising a propylene-ethylene block copolymer (A-1), a propylene homopolymer (A-2), a first and second random copolymer rubbers (B-1), (B-2), an inorganic filler (C) and a fatty acid amide (D), in the combined weight of the propylene-ethylene block copolymer (A-1), the propylene homopolymer (A-2), the first and second random copolymer rubbers (B-1), (B-2) and the inorganic filler (C), the proportion of the propylene-ethylene block copolymer (A-1) is from 5 to 84% by weight, the proportion of the propylene homopolymer (A-2) is from 1 to 40% by weight, the proportion of the first random copolymer rubber (B-1) is from 5 to 25% by weight, the proportion of the second random copolymer rubber (B-2) is from 5 to 25% by weight, the combined proportion of the first and second random copolymer rubbers (B-1), (B-2) is from 10 to 30% by weight, and the proportion of the inorganic filler (C) is from 5 to 25% by weight.

Preferably, the proportion of the propylene-ethylene block copolymer (A-1) is from 5 to 70% by weight, the proportion of the propylene homopolymer (A-2) is from 5 to 40% by weight, the proportion of the first random copolymer rubber (B-1) is from 10 to 25% by weight, the proportion of the second random copolymer rubber (B-2) is from 5 to 20% by weight, the combined proportion of the first and second random copolymer rubbers (B-1), (B-2) is from 15 to 30% by weight, and the proportion of the inorganic filler (C) is from 10 to 25% by weight.

The amount of the fatty acid amide (D) for 100 parts by weight of a combined weight of the propylene-ethylene block copolymer (A-1), the propylene homopolymer (A-2), the first and second random copolymer rubbers (B-1), (B-2) and the inorganic filler (C) is from 0.05 to 1 part by weight, and preferably from 0.1 to 0.5 part by weight.

If the content of the block copolymer (A-1) is less than 5% by weight, the impact strength may be insufficient, whereas if it is over 84% by weight, the impact resistance and the scratch resistance may deteriorate.

If the content of the first random copolymer rubber (B-1) is less than 5% by weight, the impact resistance may deteriorate, whereas if it is over 25% by weight, the rigidity may deteriorate.

If the content of the second random copolymer rubber (B-2) is less than 5% by weight, the scratch resistance may deteriorate, whereas if it is over 25% by weight, the rigidity may deteriorate.

If the combined content of the first and second random copolymer rubbers (B-2), (B-2) is less than 10% by weight, the impact resistance may deteriorate, whereas if it is over 30% by weight, the rigidity may deteriorate.

If the content of the inorganic filler (C) is less than 5% by weight, the rigidity may be insufficient, whereas if it is over 25% by weight, the impact strength may be insufficient.

If the content of the fatty acid amide (D) is over 1 part by weight, fuming may occur during the molding process of the composition or the fatty acid amide may bleed to the surface of molded articles, whereas if it is less than 0.05 part by weight, an insufficient effect of improving scratch resistance may be obtained.

In one embodiment, thermoplastic resin compositions of the present invention may be produced by mixing and kneading their components. Examples of the apparatus used for the kneading include a single-screw extruder, a twin-screw extruder, a Banbury mixer and heat rolls. The kneading temperature is typically from 170 to 250° C., and the kneading time is typically from 1 to 20 minutes. All the components may be kneaded at the same time or successively.

The method for kneading the components successively may be any of options (1), (2) and (3) shown below.

(1) A method in which the propylene-ethylene block copolymer (A-1), the first random copolymer rubber (B-1) and the second random copolymer rubber (B-2) are kneaded and then the inorganic filler (C) and the fatty acid amide (D) are added and further kneaded.

(2) A method in which the propylene-ethylene block copolymer (A-1) and the inorganic filler (C) are kneaded and then the first random copolymer rubber (B-1), the second random copolymer rubber (B-2) and the fatty acid amide (D) are added and further kneaded.

(3) A method in which the fatty acid amide (D) and some portion of the propylene-ethylene block copolymer (A-1) are kneaded and pelletized and then the remainder of the propylene-ethylene block copolymer (A-1), the first random copolymer rubber (B-1), the second random copolymer rubber (B-2) and the inorganic filler (C) are added at the same time and further kneaded.

In the method (1), (2) or (3), the propylene homopolymer (A-2) may optionally be added.

The polypropylene resin compositions of the present invention may optionally contain various additives such as antioxidant, UV absorber, pigment, antistatic agent, copper inhibitor, flame retardant, neutralizing agent, blowing agent, plasticizer, nucleating agent, foam inhibitor and crosslinking agent.

The injection-molded article of the present invention is an article which is produced by injection molding any of the polypropylene resin compositions of the present invention.

Applications of the injection-molded article of the present invention include automotive components, components of electric or electronic appliances, building or construction materials, etc. The product is preferably used as an automotive component.

In an injection-molded article produced from a polypropylene resin composition of the present invention, the rubber components are strongly oriented in the vicinity of the surface layer of the article.

The condition of the orientation of rubber components in an injection-molded article is examined through transmission electron microscopic observation of a cross section along the resin flow direction of the article. The rubber components are oriented strongly to a depth of from several tens micrometers to several hundreds micrometers from the surface. In molded articles of the present invention, the rubber components are oriented strongly to a depth of 30 μm or more from the surface of the molded articles because the second random copolymer rubber (B-2) has a high MFR.

In the present invention, "the rubber components are oriented strongly" means that the rubber components are mainly in a condition, observed in a transmission electron microscope photograph, where they have been elongated in the resin flow direction to have dimensions: 5 μm or more in length along the resin flow direction and 0.5 μm or less in thickness.

EXAMPLES

The present invention is explained by reference to examples and comparative examples below.

In Examples and Comparative Examples, physical properties are measured as follows:

(1) Melt Flow Rate (MFR; in g/10 min)

The melt flow rate of a polymeric material was measured by a method provided in JISK-6758. The measurement was conducted at a temperature of 190° C. or 230° C. and a load of 2.16 kgf. The MFR of random copolymer rubber and that of polypropylene resin composition were measured at 190° C. and 230° C., respectively.

(2) Flexural Modulus (in MPa)

The flexural modulus of a polymeric material was measured by a method provided in JIS-K-7203. The measurement was conducted at a load speed of 30 mm/min and a temperature of 23° C. using an injection-molded specimen (thickness: 6.4 mm; span length: 100 mm).

(3) Izod Impact Strength (in $kJ/m^2$)

The Izod impact strength of a polymeric material was measured by a method provided in JIS-K-7110. The measurement was conducted at a temperature of 23° C. using an injection-molded, notched specimen 3.2 mm in thickness.

(4) Intrinsic Viscosity ([η]; in dl/g)

The intrinsic viscosity of a polymeric material was measured by the following method unless otherwise stated. Using a Ubbelohde viscometer, a reduced viscosity was measured at concentrations of 0.1, 0.2 and 0.5 g/dl. The intrinsic viscosity was determined by the method disclosed in "Polymer Solutions, Polymer Experiments 11" (Kobunshi Youeki, Koubunshi Jikkengaku 11), page 491 (published by Kyoritsu Publishing Co., Ltd. in 1982), namely, a method which comprises plotting reduced viscosities against concentrations and extrapolating the plotted line to a concentration of 0 (zero). The intrinsic viscosity of polypropylene, was measured at 135° C. using tetralin as a solvent.

(5) Molecular Weight Distribution (Q Factor).

The molecular weight distribution (Q factor) of a polymeric material was measured by gel permeation chromatography (GPC) under conditions shown below.

GPC: Model 150C, manufactured by Waters

Column: Shodex 80 MA (two columns) manufactured by Showa Denko K.K.

Injection amount: 300 μl (sample concentration: 0.2 wt %)

Flow rate: 1 ml/min.

Column temperature: 135° C.

Solvent: o-dichlorobenzene

Using standard polystyrene (manufactured by Tosoh Corporation), a calibration curve of elute volume versus molecular weight was produced. Using this calibration curve, the weight average molecular weight (Mw) and the number average molecular weight (Mn) of the sample polymer based on polystyrene standard. Moreover, a Q factor, which is a ratio of Mw to Mn, was calculated and used as a measure of molecular weight distribution.

(6) Isotactic Pentad Fraction

The isotactic pentad fraction a propylene-based polymer was measured by the method described by A. Zambelli, et al. in Macromolecules, 6, 925 (1973). That is, a ratio of isotactic chains with pentad units in polypropylene chains, that is, a ratio of polypropylene monomer units present at the centers of the chains in which five propylene monomer units are continuously bonded in meso states, was measured using $^{13}C$-NMR. The assignments of absorption peaks in an NMR spectrum were carried out according to the article in Macromolecules 8, 687 (1975).

In concrete terms, an isotactic pentad fraction was obtained in terms as an area fraction of mmmm peaks in the whole peak area of methyl carbon ranges of a $^{13}C$-NMR spectrum. The isotactic pentad fraction of an NPL standard material CRM No. M19-14 Polypropylene PP/MWD/2 of the National Physical Laboratory (UK) was measured by the above method and it was found to be 0.944.

Analysis of a Propylene-ethylene Block Copolymer Composed of a Propylene Homopolymer Portion and a Propylene-ethylene Random Copolymer Portion (7) Weight Proportion (X) of the Propylene-ethylene Random Copolymer Portion in the Propylene-ethylene Block Copolymer The weight proportion (X) of a propylene-ethylene random copolymer portion in a propylene-ethylene block copolymer was calculated by use of the equation given below on the basis of the measurements of the crystal fusion heat of the propylene homopolymer portion and the propylene-ethylene block copolymer:

$$X = 1 - (\Delta Hf)_T/(\Delta Hf)_P$$

$(\Delta Hf)_T$: heat of fusion (cal/g) of the block copolymer
$(\Delta Hf)_P$: heat of fusion (cal/g) of the propylene homopolymer portion.

(8) Ethylene Content (% by Weight) of the Propylene-ethylene Random Copolymer Portion The ethylene content (% by weight) of the propylene-ethylene block copolymer was measured by the infrared absorption spectrum method and then the ethylene content of the propylene-ethylene random copolymer portion was calculated from the following equation:

$$(C2')_{EP} = (C2')_T/X$$

$(C2')_T$: ethylene content (% by weight) of the block copolymer
$(C2')_{EP}$: ethylene content (% by weight) of propylene-ethylene random copolymer portion.

(9) Intrinsic Viscosity ($[\eta]_{EP}$; in dl/g) of the Propylene-ethylene Random Copolymer Portion The intrinsic viscosity $[\eta]_{EP}$ of the propylene-ethylene random copolymer portion was calculated by use of the equation given below on the basis of the measurements of the intrinsic viscosities of the propylene homopolymer portion and the propylene-ethylene block copolymer:

$$[\eta]_{EP} = [\eta]_T/X - (1/X - 1)[\eta]_P$$

$[\eta]_P$: an intrinsic viscosity (dl/g) of the propylene homopolymer portion
$[\eta]_T$: an intrinsic viscosity (dl/g) of the block copolymer.

The intrinsic viscosity $[\eta]_P$ of the propylene homopolymer portion, which is the first segment of the propylene-ethylene block copolymer, was determined by sampling some of the propylene homopolymer portion from the polymerization reactor after the production thereof during the production of the propylene-ethylene block copolymer.

(10) Scratch Resistance Test (a) Method for Evaluating Scratch (A)

Using a special large-sized scratch tester manufactured by UESHIMA SEISAKUSYO CO., LTD., a scratch test was carried out under the following conditions.

To a mirror-finished flat board 100 mm×400 mm×3 mm, a weight of 1500 g was applied through a needle used for a scratch test the tip of which was a hemisphere (material: SUS403) 1 mm in diameter. Then, the plate was scratched at a rate of 600 mm/min.

Using a surface roughness a surface texture and contour measuring instrument (SURFCOM 550A) TOKYO SEIMITSU CO., LTD., scratches on the surface of the flat board was measured. For evaluating the noticeability of scratches, the depth from the swelled portion formed along a scratch to the bottom of the scratch was measured in a unit of 0.1 μm. In addition, the degree of noticeability of scratch was judged visually. The degree of noticeability:

○: the surface is not whitened and no scratches are noticeable.

Δ: the surface is whitened a little and scratches are noticeable.

x: the surface is whitened and scratches are considerably noticeable.

(b) Method for Evaluating Scratch (B)

A flat grained plate having dimensions of 100 mm×400 mm×3 mm was leaned at an angle of 60° with respect to the horizontal plane. An impact weight shown in FIG. 1 was dropped on the leaned plate from a height of 70 cm to make a damage. The degree of the noticeability of the damage was judged visually.

The degree of noticeability:

○: the surface is not whitened and no damage are noticeable.

Δ: the surface is whitened a little and damage are noticeable.

x: the surface is whitened and damage are considerably noticeable.

(11) Transmission Electron Microscopic Observation

From the central portion of an injection-molded specimen (No. 1 dumbbell prescribed in ASTM D638; in the central portion, the thickness was 3.2 mm and the width was 13 mm), a block having a thickness of 3.2 mm, a width of 10 mm and a length of 5 mm was cut out. The length of the block was matched with the longitudinal direction of the dumbbell-shaped specimen, which longitudinal direction was basically identical to the flow direction of the polymeric material during the injection molding.

Further, by means of a microtome cooled to low temperatures from −80° C. to −50° C., an ultrathin section having a thickness of about 100 nm and having a face parallel to the imaginary planes defined by the thickness and longitudinal directions of the dumbbell-shaped specimen was cut out from the above-mentioned block, especially from its surface portion extending to the depth of about 100 μm from the surface, which had been a surface of the dumbbell-shaped specimen. Prior to cutting of the 100 nm-thick ultrathin section, the block was exposed to vapor generated from a 1% aqueous solution of $RuO_4$ heated to 60° C., thereby being stained. The stained ultrathin section was observed by transmission electron microscope. Thus, the orientation state of rubber components in the injection-molded article was observed.

Examples 1 to 3 and Comparative Examples 1 to 2

(Sample)

(A-1-1) Propylene-ethylene Block Copolymer (BC-1)

AZ864 manufactured by Sumitomo Chemical Co., Ltd. which is a propylene-ethylene block copolymer composed of a propylene homopolymer portion (first segment) and a propylene-ethylene random copolymer portion (second segment). AZ864 had an MFR (at 230° C.) of 30 g/10 min.

The first segment had a Q factor of 4.2, an intrinsic viscosity ($[\eta]_P$) of 1.05 dl/g and an isotactic pentad fraction of 0.97. The second segment had an intrinsic viscosity ($[\eta]_{EP}$) of 2.5 dl/g, a weight proportion of 20% by weight based on the propylene-ethylene block copolymer (BC-1), and an ethylene content of 40% by weight.

(A-1-2) Propylene-ethylene Block Copolymer (BC-2)

WPX5343 manufactured by Sumitomo Chemical Co., Ltd. which is a propylene-ethylene block copolymer composed of a propylene homopolymer portion (first segment) and a propylene-ethylene random copolymer portion (second segment). WPX5343 had an MFR (at 230° C.) of 52 g/10 min. The first segment had a Q factor of 4.2, an intrinsic viscosity ($[\eta]_P$) of 0.92 dl/g and an isotactic pentad fraction of 0.97. The second segment had an intrinsic viscosity ($[\eta]_{EP}$) of 5.0 dl/g, a weight proportion of 13% by weight based on the propylene-ethylene block copolymer (BC-2), and an ethylene content of 32% by weight.

(A-2-1) Propylene Homopolymer (PP-1)

U101E1 manufactured by Sumitomo Chemistry Co., Ltd., which had a Q factor of 4.2, an intrinsic viscosity ($[\eta]_P$) of 0.92 dl/g, an isotactic pentad fraction of 0.97, and an MFR (at 230° C.) of 120 g/10 min.

(A-2-2) Propylene Homopolymer (PP-2)

Y501 manufactured by Sumitomo Chemistry Co., Ltd., which had a Q factor of 4.2, an intrinsic viscosity ($[\eta]_P$) of 1.45 dl/g, an isotactic pentad fraction of 0.97, and an MFR (at 230° C.) of 13 g/10 min.

(B-1-1) Random Copolymer Rubber

Ethylene-1-octene random copolymer rubber (EN-GAGE8842, manufactured by Du Pont Dow Elastomers), which had a density of 0.858 g/cm$^3$ and an MFR (at 190° C.) of 1 g/10 min.

(B-1-2) Random Copolymer Rubber

Ethylene-1-octene random copolymer rubber (EN-GAGE8100, manufactured by Du Pont Dow Elastomers), which had a density of 0.870 g/cm$^3$ and an MFR (at 190° C.) of 1 g/10 min.

(B-2-1) Random Copolymer Rubber

Ethylene-1-butene random copolymer rubber (Excellen FX CX5505, manufactured by Sumitomo Chemical Co., Ltd.), which had a density of 0.870 g/cm$^3$ and an MFR (at 190° C.) of 15 g/10 min.

(B-2-2) Random Copolymer Rubber

Ethylene-1-octene random copolymer rubber (EN-GAGE8130, manufactured by Du Pont Dow Elastomers), which had a density of 0.864 g/cm$^3$ and an MFR (at 190° C.) of 13 g/10 min.

(B-2-3) Random Copolymer Rubber

Ethylene-1-octene random copolymer rubber (EN-GAGE8407, manufactured by Du Pont Dow Elastomers), which had a density of 0.870 g/cm$^3$ and an MFR (at 190° C.) of 30 g/10 min.

(C) Inorganic Filler (Talc-1)

Talc (MW HS-T, manufactured by Hayashi Kasei Co., Ltd.), which had an average particle diameter of 2.7 μm.

(D) Fatty Acid Amide

Erucamide (Neutron S, manufactured by Nippon Fine Chemical Co., Ltd.)

[Polypropylene Resin Composition]

Ingredients were blended so that the composition shown in Table 1 was established and the blend was preliminarily mixed uniformly with a Henschel mixer. A polypropylene resin composition was produced by melt-kneading the resulting pre-mixed material using a twin-screw extruder (TEX44SS-31.5BW-2V manufactured by The Japan Steel Works, Ltd.) at an extrusion rate of 30 kg/hr, a screw speed of 350 rpm under vent suction. The MFR of the polypropylene resin composition obtained was measured and the result is shown in Table 2.

[Specimen for Physical Property Evaluation]

Specimens for physical property evaluation were prepared by injection molding in the following manner.

A polypropylene resin composition was dried in a hot air dryer at 120° C. for two hours and then was injection-molded using an injection molding machine manufactured by Toshiba Machine Co., Ltd. Model IS150E-V at a molding temperature of 180° C., a mold cooling temperature of 50° C., an injection time of 15 seconds and a cooling time of 30 seconds. The resulting injection-molded article was measured for flexural modulus and Izod impact strength. The results are shown in Table 2.

A flat board for a scratch test was prepared under the following conditions. The polypropylene resin compositions obtained above were dried in a hot air dryer at 120° C. for 2 hours and then injection-molded using an injection molding machine manufactured by Sumitomo Heavy Industries, Ltd., Neomat Model 515/150, at a molding temperature of 220° C., a mold cooling temperature of 50° C., at an injection time and an pressure hold time, in total, of 15 sec and a cooling time of 30 sec. The injection-molded articles obtained were subjected to a scratch test. The results are shown in Table 2.

TABLE 1

|  | A-1-1 | A-1-2 | A-2-1 | A-2-2 | B-1-1 | B-1-2 | B-2-1 | B-2-2 | B-2-3 | Talc-1 | D |
|---|---|---|---|---|---|---|---|---|---|---|---|
| Example 1 | 25 | 0 | 25 | 15 | 12 | 0 | 12 | 0 | 0 | 11 | 0.2 |
| Example 2 | 24 | 0 | 25 | 15 | 13 | 0 | 0 | 12 | 0 | 11 | 0.2 |
| Example 3 | 25 | 0 | 20 | 20 | 12 | 0 | 0 | 0 | 12 | 11 | 0.2 |
| Comparative Example 1 | 25 | 0 | 40 | 0 | 12 | 12 | 0 | 0 | 0 | 11 | 0.2 |
| Example 4 | 0 | 63 | 0 | 0 | 15 | 0 | 11 | 0 | 0 | 11 | 0.2 |

TABLE 2

|  | MFR g/10 min | Flexural modulus MPa | Izod impact strength kJ/m$^2$ | Scratch test A (Noticeability) | (Depth) μm | Scratch test B Noticeability |
|---|---|---|---|---|---|---|
| Example 1 | 25 | 1600 | 51 | ◯ | 72 | ◯ |
| Example 2 | 26 | 1610 | 56 | ◯ | 73 | ◯ |
| Example 3 | 23 | 1570 | 54 | ◯ | 72 | ◯ |
| Comparative Example 1 | 32 | 1540 | 65 | Δ | 82 | x |
| Example 4 | 28 | 1370 | 64 | ◯ | 74 | ◯ |

Examples 1 to 3 are superior in balance between impact resistance and rigidity and also are superior in scratch resistance.

Contrary to this, in Comparative Example 1 where no random copolymer rubber (B-2) was used, the scratch resistance was insufficient. In particular, the damage resistance judged on the basis of the degree of noticeability of damage in the scratch test (B) was insufficient.

Figure 2:
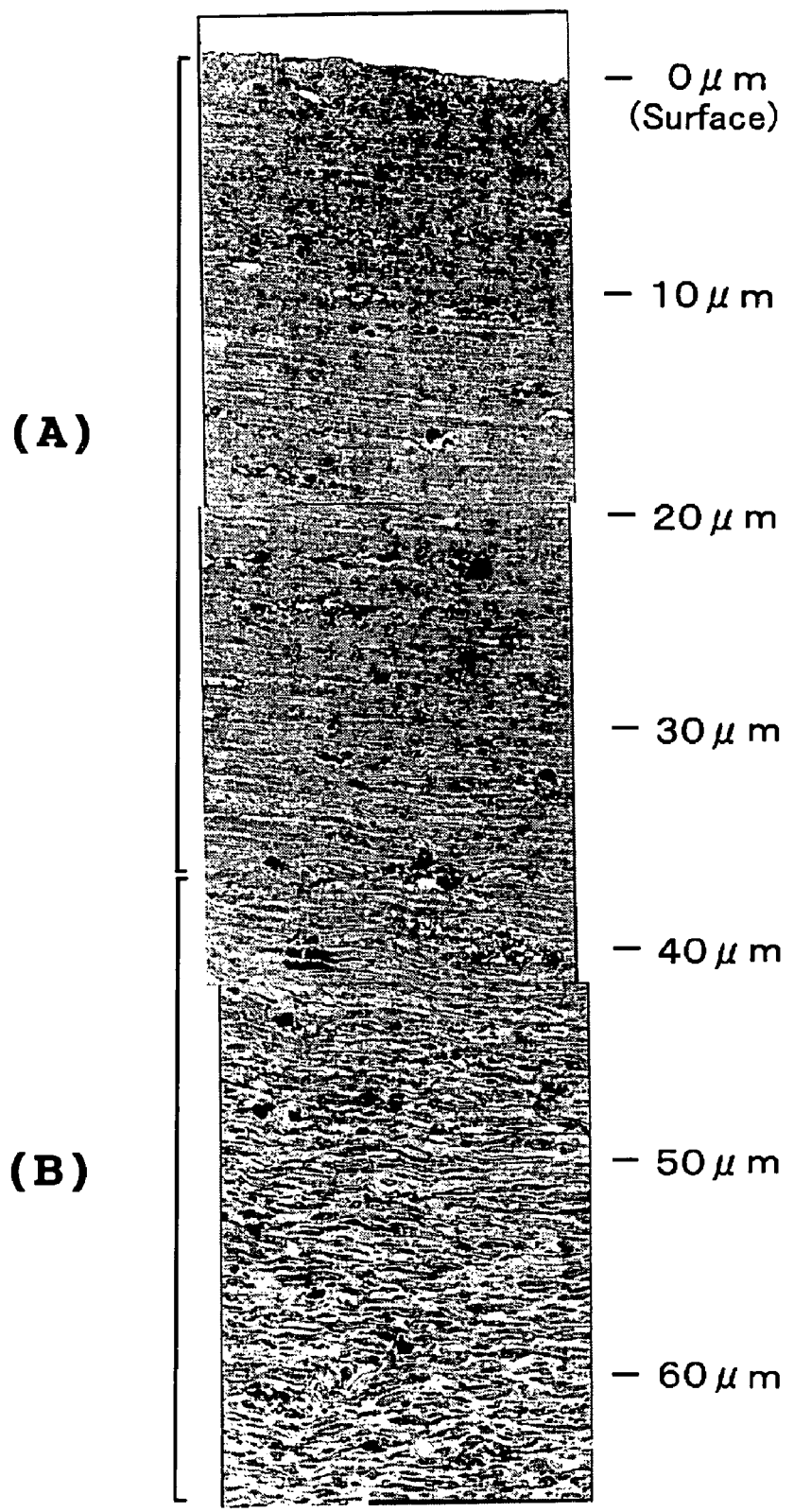
FIG. 2 is a transmission electron microscope photograph of a cross section of a portion near the surface of the injection-molded article of Example 1.
Figure 3:
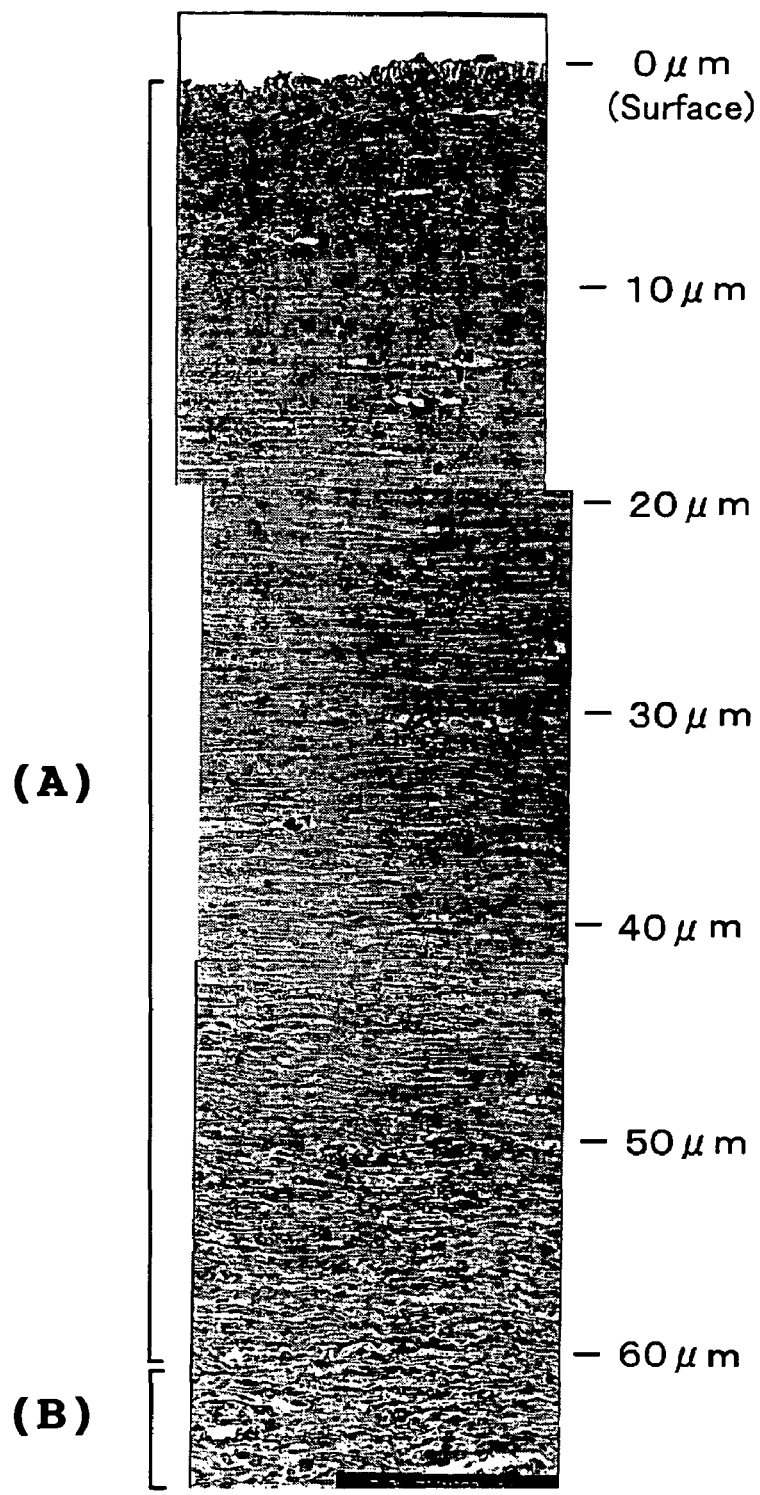
FIG. 3 is a transmission electron microscope photograph of a cross section of a portion near the surface of the injection-molded article of Example 3.
Figure 4:
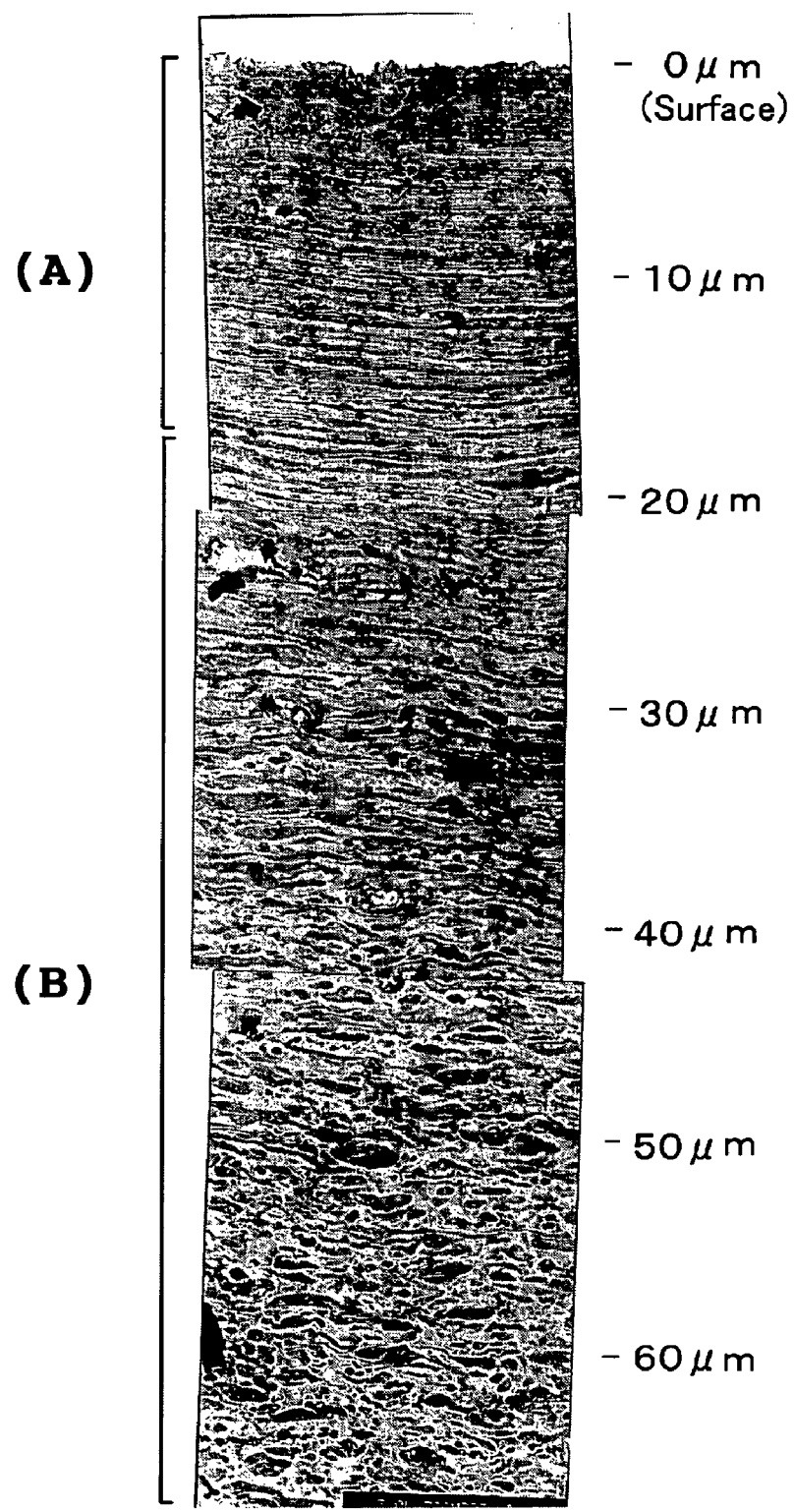
FIG. 4 is a transmission electron microscope photograph of a cross section of a portion near the surface of the injection-molded article of Comparative Example 1.

Examination of Rubber Orientation in the Vicinity of the Surface by Transmission Electron Microscope Observation The rubber orientation in the vicinity of the surfaces of the molded articles of Examples 1, 3 and Comparative Example 1 was observed by a transmission electron microscope. The results are shown in FIGS. 2, 3 and 4.

In the figures, (A) shows a portion where rubber is oriented strongly and (B) shows a portion where the rubber orientation is weak. In Comparative Example 1, in which no (B-2) was used, orientation of rubber is weakened at the portion about 18 μm from the surface, whereas in Examples 1 and 3, in which (B-2) was used, rubber is oriented strongly to 35 μm and 60 μm, respectively, from the surface.

What is claimed is:

1. A polypropylene resin composition comprising:
a propylene-ethylene block copolymer (A-1),
a first random copolymer rubber (B-1),
a second random copolymer rubber (B-2),
an inorganic filler (C), and
a fatty acid amide (D),
wherein in the combined weight of the propylene-ethylene block copolymer (A-1), the first and second random copolymer rubbers (B-1), (B-2) and the inorganic filler (C), the proportion of the propylene-ethylene block copolymer (A-1) is from 45 to 85% by weight, the proportion of the first random copolymer rubber (B-1) is from 5 to 25% by weight, the proportion of the second random copolymer rubber (B-2) is from 5 to 25% by weight, the combined proportion of the first and second random copolymer rubbers (B-1), (B-2) is from 10 to 30% by weight, and the proportion of the inorganic filler (C) is from 5 to 25% by weight, and wherein the amount of the fatty acid amide (D) for 100 parts by weight of a combined weight of the propylene-ethylene block copolymer (A-1), the first and second random copolymer rubbers (B-1), (B-2) and the inorganic filler (C) is from 0.05 to 1 part by weight;
wherein the first random copolymer rubber (B-1) is a random copolymer rubber composed of ethylene and α-olefin having 4-20 carbon atoms and the first random copolymer rubber (B-1) has a density of from 0.85 to 0.885 g/cm$^3$ and a melt flow rate measured at 190° C. of 5 g/10 min or less,
wherein the second random copolymer rubber (B-2) is a random copolymer rubber composed of ethylene and α-olefin having 4-20 carbon atoms and the second random copolymer rubber (B-2) has a density of from 0.85 to 0.885 g/cm$^3$ and a melt flow rate measured at 190° C. of 10 g/10 min to 50 g/10 min.

2. A polypropylene resin composition comprising:
a propylene-ethylene block copolymer (A-1),
a propylene homopolymer (A-2),
a first random copolymer rubber (B-1),
a second random copolymer rubber (B-2),
an inorganic filler (C), and
a fatty acid amide (D),
wherein in the combined weight of the propylene-ethylene block copolymer (A-1), the propylene homopolymer (A-2), the first and second random copolymer rubbers (B-1), (B-2) and the inorganic filler (C), the proportion of the propylene-ethylene block copolymer (A-1) is from 5 to 84% by weight, the proportion of the propylene homopolymer (A-2) is from 1 to 40% by weight, the proportion of the first random copolymer rubber (B-1) is from 5 to 25% by weight, the proportion of the second random copolymer rubber (B-2) is from 5 to 25% by weight, the combined proportion of the first and second random copolymer rubbers (B-1), (B-2) is from 10 to 30% by weight, and the proportion of the inorganic filler (C) is from 5 to 25% by weight, and
wherein the amount of the fatty acid amide (D) for 100 parts by weight of a combined weight of the propylene-ethylene block copolymer (A-1), the propylene homopolymer (A-2), the first and second random copolymer rubbers (B-1), (B-2) and the inorganic filler (C) is from 0.05 to 1 part by weight;
wherein the first random copolymer rubber (B-1) is a random copolymer rubber composed of ethylene and α-olefin having 4-20 carbon atoms and the first random copolymer rubber (B-1) has a density of from 0.85 to 0.885 g/cm$^3$ and a melt flow rate measured at 190° C. of 5 g/10 min or less,
wherein the second random copolymer rubber (B-2) is a random copolymer rubber composed of ethylene and α-olefin having 4-20 carbon atoms and the second random copolymer rubber (B-2) has a density of from 0.85 to 0.885 g/cm$^3$ and a melt flow rate measured at 190° C. of 10 g/10 min to 50 g/10 min.

3. The polypropylene resin composition according to claim 1, wherein the fatty acid amide (D) is a fatty acid amide represented by formula (1) provided below:

$$RCONH_2 \quad (1)$$

wherein R represents an alkyl or alkenyl group having from 5 to 25 carbon atoms.

4. The polypropylene resin composition according to claim 2, wherein the fatty acid amide (D) is a fatty acid amide represented by formula (1) provided below:

$$RCONH_2 \quad (1)$$

wherein R represents an alkyl or alkenyl group having from 5 to 25 carbon atoms.

5. The polypropylene resin composition according to claim 1, wherein the first random copolymer rubber (B-1) is an ethylene-butene-1 random copolymer rubber or ethylene-octene-1 random copolymer rubber which has a density of from 0.855 to 0.870 g/cm$^3$ and a melt flow rate measured at 190° C. of 3 g/10 min or less, and the second random copolymer rubber (B-2) is an ethylene-butene-1 random copolymer rubber or ethylene-octene-1 random copolymer rubber which has a density of from 0.855 to 0.880 g/cm$^3$ and a melt flow rate measured at 190° C. of 12 g/10 min to 50 g/10 min.

6. The polypropylene resin composition according to claim 2, wherein the first random copolymer rubber (B-1) is an ethylene-butene-1 random copolymer rubber or ethylene-octene-1 random copolymer rubber which has a density of from 0.855 to 0.870 g/cm$^3$ and a melt flow rate measured at 190° C. of 3 g/10 min or less, and the second random copolymer rubber (B-2) is an ethylene-butene-1 random copolymer rubber or ethylene-octene-1 random copolymer rubber which has a density of from 0.855 to 0.880 g/cm$^3$ and a melt flow rate measured at 190° C. of 12 g/10 min to 50 g/10 min.

7. The polypropylene resin composition according to claim 1, wherein the inorganic filler (C) is an inorganic filler selected from the group consisting of talc and fibrous magnesium oxysulfate.

8. The polypropylene resin composition according to claim 2, wherein the inorganic filler (C) is an inorganic filler selected from the group consisting of talc and fibrous magnesium oxysulfate.

9. An injection-molded article comprising the polypropylene resin composition according to claim 1.

10. The polypropylene resin composition according to claim 3, wherein the first random copolymer rubber (B-1) is an ethylene-butene-1 random copolymer rubber or ethylene-octene-1 random copolymer rubber which has a density of from 0.855 to 0.870 g/cm$^3$ and a melt flow rate measured at 190° C. of 3 g/10 min or less, and the second random copolymer rubber (B-2) is an ethylene-butene-1 random copolymer rubber or ethylene-octene-1 random copolymer rubber which has a density of from 0.855 to 0.880 g/cm$^3$ and a melt flow rate measured at 190° C. of 12 g/10 min to 50 g/10 min.

11. The polypropylene resin composition according to claim 4, wherein the first random copolymer rubber (B-1) is an ethylene-butene-1 random copolymer rubber or ethylene-octene-1 random copolymer rubber which has a density of from 0.855 to 0.870 g/cm$^3$ and a melt flow rate measured at 190° C. of 3 g/10 min or less, and the second random copolymer rubber (B-2) is an ethylene-butene-1 random copolymer rubber or ethylene-octene-1 random copolymer rubber which has a density of from 0.855 to 0.880 g/cm$^3$ and a melt flow rate measured at 190° C. of 12 g/10 min to 50 g/10 min.

12. The polypropylene resin composition according to claim 3, wherein the inorganic filler (C) is an inorganic filler selected from the group consisting of talc and fibrous magnesium oxysulfate.

13. The polypropylene resin composition according to claim 5, wherein the inorganic filler (C) is an inorganic filler selected from the group consisting of talc and fibrous magnesium oxysulfate.

14. The polypropylene resin composition according to claim 4, wherein the inorganic filler (C) is an inorganic filler selected from the group consisting of talc and fibrous magnesium oxysulfate.

15. The polypropylene resin composition according to claim 6, wherein the inorganic filler (C) is an inorganic filler selected from the group consisting of talc and fibrous magnesium oxysulfate.

16. An injection-molded article comprising the polypropylene resin composition according to claim 2.

17. The polypropylene resin composition according to claim 1, wherein the first random copolymer rubber (B-1) has a melt flow rate measured at 190° C. of 1 g/10 min to 5 g/10 min.

18. The polypropylene resin composition according to claim 2, wherein the first random copolymer rubber (B-1) has a melt flow rate measured at 190° C. of 1 g/10 min to 5 g/10 min.

* * * * *